June 18, 1957 R. P. LAMBECK ET AL 2,796,138
PITCH LOCK WITH HYDRAULIC LATCH
Filed Aug. 19, 1953 3 Sheets-Sheet 1

INVENTORS
RAYMOND P. LAMBECK
NORMAN B. NEWTON
BY Leonard F. Wehrlin
ATTORNEY

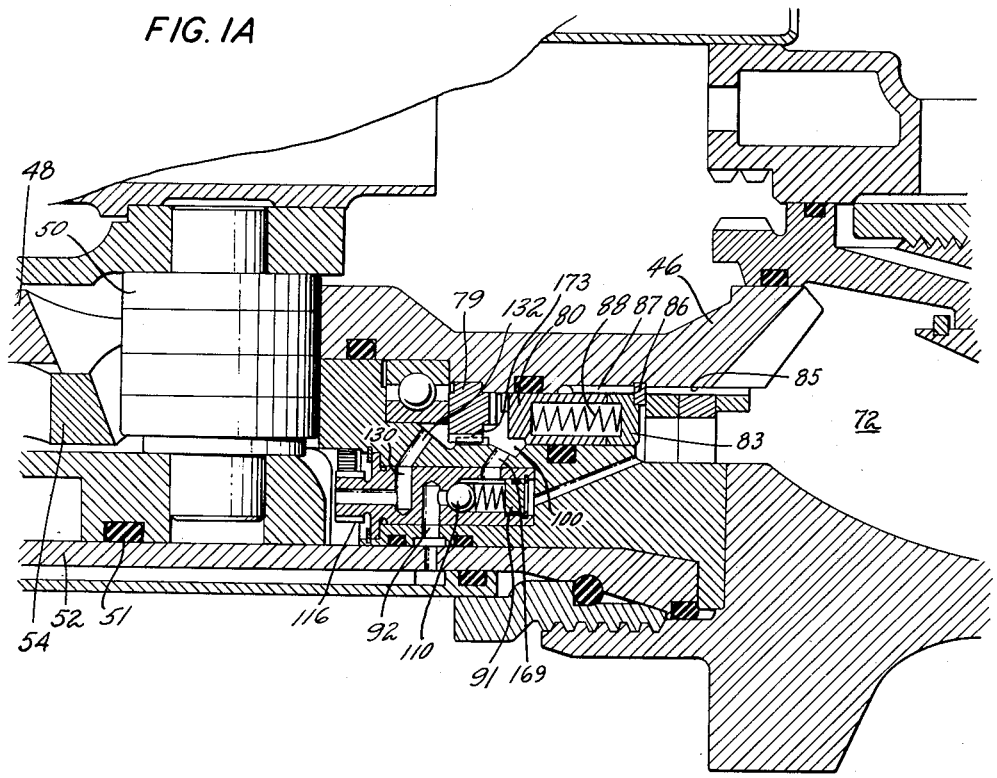
FIG. IA

INVENTORS
RAYMOND P. LAMBECK
NORMAN B. NEWTON
BY Leonard F. Wetelind
ATTORNEY

United States Patent Office 2,796,138
Patented June 18, 1957

2,796,138
PITCH LOCK WITH HYDRAULIC LATCH

Raymond P. Lambeck, Manchester, and Norman B. Newton, South Glastonbury, Conn., assignors to United Aircraft Corporation, East Hartford, Conn., a corporation of Delaware Application August 19, 1953, Serial No. 375,168

8 Claims. (Cl. 170—160.21)

This invention relates to variable pitch propellers and more particularly to propellers having positive blade pitch locks.

It is an object of this invention to provide a variable pitch propeller having a positive pitch lock for preventing blade pitch variation under certain conditions.

It is a further object of this invention to provide a pitch lock for a variable pitch propeller wherein the pitch lock mechanism responds to the speed of rotation of the propeller to lock the blades against pitch changing movement.

It is another object of this invention to provide a pitch lock for a variable pitch propeller including a hydraulic latch for the lock.

A still further object of this invention is to provide a hydraulic latch for a fluid operated pitch lock which will maintain the lock in an unlocked position in the event of a loss of pressure but will disable the latch to permit a lock-up when a propeller overspeed condition exists.

An additional object of this invention is to provide a pitch lock which cannot be unlocked until propeller R. P. M. has returned to a normal value and the propeller is able to change pitch toward a higher blade angle.

These and other objects of this invention will become readily apparent from the following detail description of the drawings in which:

Fig. 1A is an enlarged cross section of a portion of Fig. 1 illustrating the lock mechanism.

In fluid operated mechanical pitch locks for variable pitch propellers it is desirable to maintain the pitch lock in an unlocked position in the event of a loss of operating pressure until there is an actual overspeed condition of the propeller. In copending patent application Serial No. 375,167 filed as of even date by R. P. Lambeck, a pitch lock with a mechanical latch is disclosed. This invention provides a hydraulic latch which will maintain the pitch lock in an unlocked position until a propeller overspeed condition exists.

Figure 1:
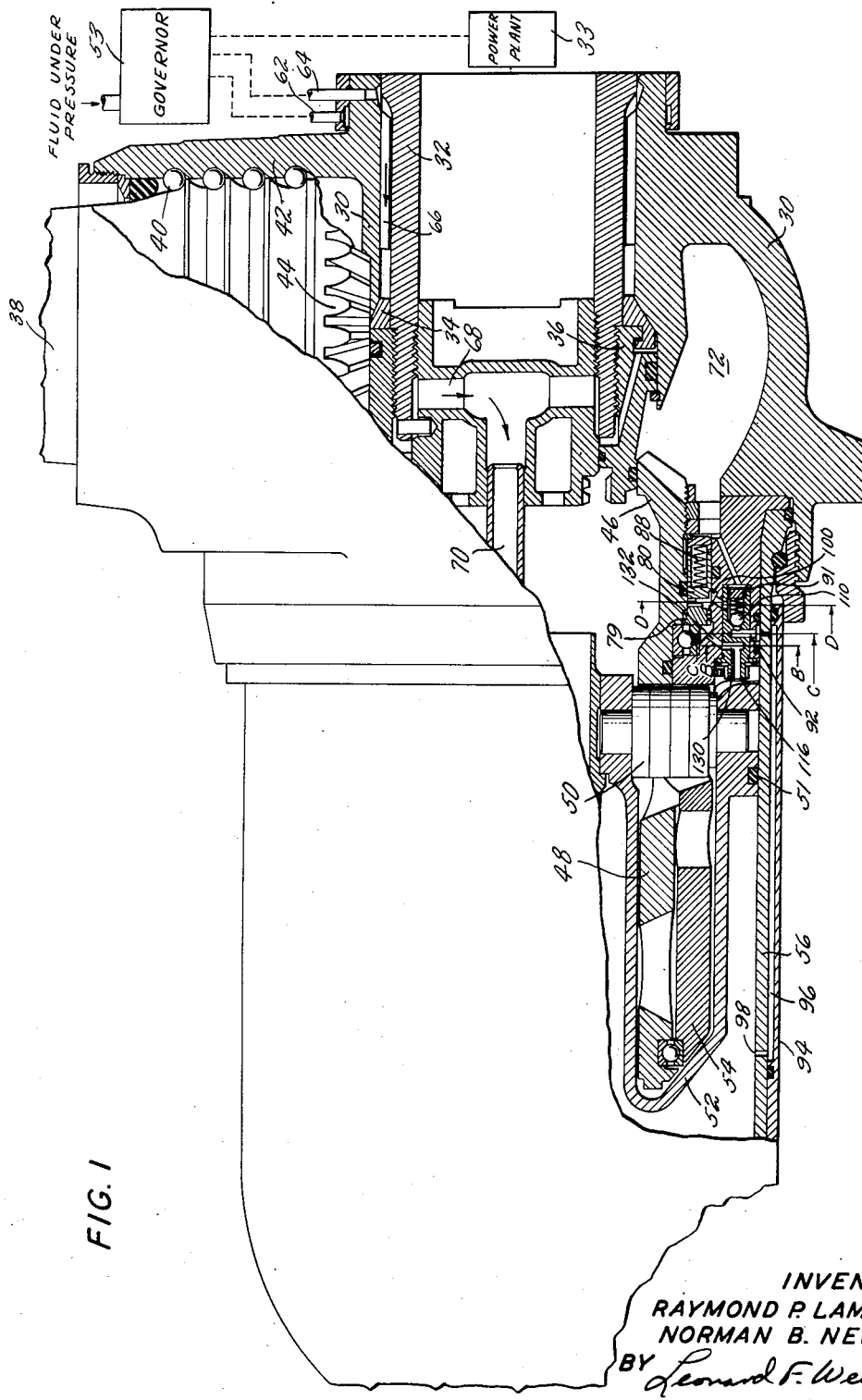
Fig. 1 is a partial cross-sectional illustration of a typical embodiment of this invention in a propeller mechanism.

Fig. 1 illustrates a typical embodiment of the mechanism of this invention. The propeller shown in Fig. 1 comprises a hub 30 secured on a shaft 32 which may be driven by a power plant 33. The hub 30 is retained in position on the shaft 32 by the usual cones 34 and retaining nut 36. The cones 34 are of the split type to permit installation. Hub 30 carries a plurality of blades 38 mounted for pitch changing movement on bearings 40 in the hub socket 42. Each blade 38 is provided with a gear segment 44 which meshes with a common gear 46 for simultaneously turning all the blades to vary their pitch. Gear 46 is actuated by, and may be integral with, a cam 48 which is turned by the action of cam followers 50 movable by a piston 52 and cooperating with both cam 48 and a fixed cam 54. For a more detailed description of a cam and cam followers reference may be made to Caldwell et al. Patent No. 2,173,717 or Martin et al. Patent No. 2,280,713.

Piston 52 is slidable fore and aft by a preponderance of oil under pressure on one side or the other in a cylinder formed by the dome 56. The piston 52 is shown as sealed at the cylinder wall by an O-ring seal 51. From the above description it is apparent that a preponderance of pressure on either side of piston 52 will move the piston and cause a change in the pitch of the propeller blades. Oil is conducted from a governor 53 which is driven in timed relation with the propeller. Oil under pressure from the governor is led to lines 62 and 64 and acts to selectively increase the pressure in one of these lines and reduce the pressure in the other of these lines in order to move the piston 52 and control the propeller pitch to maintain a constant speed. In moving the blades toward high pitch, high pressure fluid is conducted to the line 64 where it passes through the splines 66, then to the passages 68 and 70 and eventually to the front side of the piston 52. In order to move the propeller blades toward low pitch the governor conducts high pressure fluid to the line 62 from where it is conducted to the aft side of the piston 52 and also the hub chamber 72. The relative pressures for high and low pitch change and their effect on propeller operation are clearly set forth in Patent No. 2,636,566 issued April 28, 1953 to Chester J. Jedrziewski.

The pitch lock mechanism of this invention is contained within the hub structure of the propeller and comprises a toothed pitch lock element 80 which is rotatable with respect to the hub structure as the blades rotate about their respective axes, together with a second toothed pitch lock element 79 which is held stationary with respect to the hub structure. Each of the pitch lock elements 79 and 80 is in the form of a ring, only a single section of which is shown in Figs. 1 and 1A. The first pitch lock element 80 is connected by means of the splines 87 to the rotating cam 48 and the blade interconnecting gear 46 and is slidable in a direction parallel to the axis of rotation of the propeller hub to selectively engage with or disengage from the mating toothed pitch lock element 79.

The second pitch lock element 79 is connected by means of the splines 171 to the fixed cam 54, which in turn is fixed against rotation with respect to the hub structure of the propeller. Thus locking of the blade angle is accomplished by bringing the teeth of the pitch lock elements 79 and 80 together to prevent the rotating cam 48 and the fixed cam 54 from relative motion which in turn prevents blade angle change, substantially as shown in patent application Serial No. 275,051, filed March 6, 1952 by David R. Pearl, now U. S. Patent No. 2,703,148. When fluid under pressure is conducted to chamber 100, the pitch lock ring element 80 is forced to the right to compress a multiplicity of springs 88 (only one of which is shown in Fig. 1A) and the teeth of element 80 are disengaged from the teeth of element 79. Re-engagement of the teeth is accomplished by removing the pressure from the fluid in chamber 100 substantially as described below, thus allowing the springs 88 to push the teeth of element 80 into locking relation with the teeth of pitch lock ring element 79.

The right-hand ends of the springs 88 abut against a ring-like seat 83, which also serves as a limit of travel of the pitch lock element 80 in the unlocking direction. Each of the springs 88 has a chamber in which it is supported, and these chambers communicate hydraulically with the chamber 72 in order to allow the drainage of any fluid present in the spring chambers when the pitch lock ring element 80 is moved to the right, as in Fig. 1A. This drainage path leads from the chambers of springs 88 between the mutually abutting faces of rings 80 and 83, to the right along spline 87, through the clearances around lock ring 86 in its groove as well as through the end gap of the ring 86, and to the right along spline 85.

Figure 3:
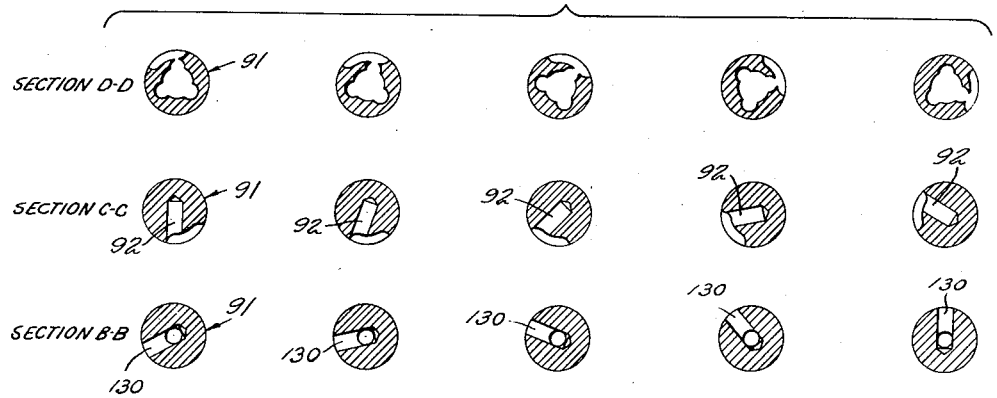
Fig. 3 is a combined illustration of various valve positions and taken along the lines B—B, C—C and D—D of Fig. 1.

The overspeed control valve 91, shown most clearly in Fig. 1A, is sectioned for illustrative purposes along the three planes indicated in Fig. 1. These sections are shown in Fig. 3, where the sections in the far left column show the cruising propeller R. P. M. case, and the other columns represent the rotational positions of the overspeed control valve for four different increments of increased propeller R. P. M. Fluid pressure corresponding to that existing on the outboard or forward side of the dome piston 52 is routed to port 92 of the valve 91, and fluid pressure corresponding to that existing on the inboard or rear side of the dome piston 52 is routed to port 130 of the valve 91. Under normal governing conditions when the propeller is at a cruising R. P. M., the high pitch pressure applied to port 92 will be higher than the low pitch pressure available at port 130, ports 92 and 169 will be open, and port 130 will be closed. Thus fluid pressure is routed through ports 92 and 169 to chamber 100, where it exerts a force sufficient to compress the springs 88 and move the pitch lock element 80 to the right. This same pressure is available through the splines 173 on the outside diameter of the lock member 79 to chamber 132, but the fact that valve port 130 is closed at normal operating speeds prevents loss of pressure by this route.

As the propeller goes towards the overspeed condition as indcated progressively by columns 2, 3, 4, and 5 in Fig. 3, ports 92 and 169 are closed and port 130 is opened. This is caused by an increase in propeller R. P. M. beyond a selected point which is adjusted by selection of the rate of and the preload of spring 126 (shown in Fig. 2). Any such overspeeding of the propeller results from a condition of insufficient fluid pressure on the outboard side of the dome piston 52 accompanied by a lower drain pressure on the inboard side of the dome piston 52. When port 130 is opened, chamber 132, spline 173, and chamber 100 are connected to drain pressure, thus allowing the springs 88 to move the pitch lock element 80 to the left and into locking engagement with the pitch lock element 79. The fluid pressure in chamber 72 is always the same as the pressure available at port 130 since both are in communication with the inboard side of the dome piston 52 at all times. Consequently, for pitch locking operation chamber 100 is connected to port 130 and the connection between chamber 72 and the chambers containing springs 88 is always open, so essentially the same fluid pressure exists on both sides of the pitch lock element 80, and the force of springs 88 is unbalanced and will force the pitch lock elements 79 and 80 into engagement.

Under decrease pitch operating conditions, including unfeathering and reversing, fluid pressure on the inboard side of the dome piston 52 is increased, and the chambers connected to the outboard side of the dome piston 52 are connected to drain. Thus, a relatively high pressure exists in chamber 72 and at the port 130, while drain pressure exists at port 92. The high pressure communicated from chamber 72 to the chambers of springs 88 as described above will exert a force to the left on the pitch lock element 80, but this force will be balanced by a rise in pressure of the fluid trapped in chambers 100 and 132 so long as the check valve 110 and the port 130 are closed. Check valve 110 will remain closed so long as pressure at port 92 does not become higher than the pressure existing in chamber 100, and port 130 will remain closed so long as the propeller does not overspeed to the degree represented by column 5 of Fig. 3. Consequently, the pitch lock elements 80 and 79 will remain disengaged unless port 130 is opened by an overspeed condition. This is the hydraulic latch which prevents inadvertent engagement of the pitch lock.

The operation of the pitch lock elements and the overspeed control valve in the case of a minor overspeed will be indicated by an examination of columns 2, 3, and 4 of Fig. 3. Such an overspeed would always be caused by the characteristic inadequacy of fluid pressure on the outboard side of the dome piston 52, and in each case the check valve 110 would close and the fluid in chambers 100 and 132 would remain trapped unless released through port 130 by an overspeed of the magnitude required to move the overspeed control valve 91 to the position represented by column 5 of Fig. 3.

Figure 2:
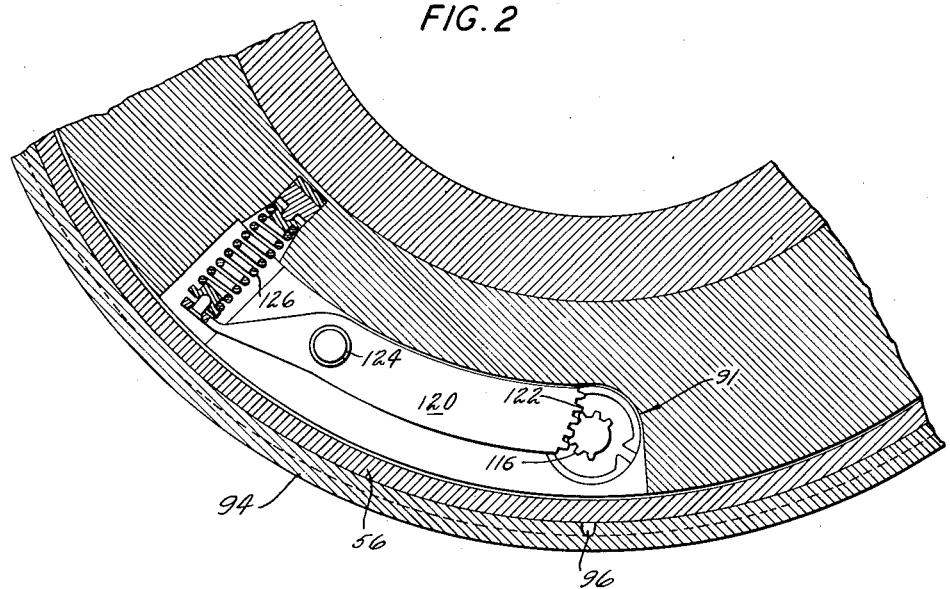
Fig. 2 is a partial detailed cross-sectional view of the centrifugal mechanism for controlling the pitch lock and latch.

The overspeed control valve 91 is provided at the left end thereof with a gear 116 adapted to be rotated by a centrifugal member 120, more clearly shown in Fig. 2. As shown in Fig. 2, the overspeed control valve 91 will be rotated in a counterclockwise direction by an overspeed of the propeller. The centrifugal member 120 is located near the outer periphery of the dome 30 and includes a gear segment 122 at one end thereof which engages the gear 116 on the valve 91 in order to rotate the valve 91 as the centrifugal force on member 120 is increased. Member 120 is pivoted at 124 intermediate its ends, and the relatively light-weight end of the member 120 is biased by a spring 126 of the desired characteristics. In practice, increasing centrifugal force on the heavier end of the member 120 will compress the spring 126 so that the member 120 will assume a particular position for each operating speed of the propeller, with a corresponding rotational position of the valve 91 being set for each operating speed of the propeller. Representative positions for selected speeds are indicated by Fig. 3. Thus it may be seen that a propeller R. P. M. may be selected at which the valve 91 reaches the rotational position indicated by column 5 of Fig. 3, and the pitch lock will always be engaged at this selected R. P. M. Provisions are also made for the prevention of inadvertent locking of the elements 79 and 80 under any conditions other than a propeller overspeed.

As a result of this invention it is apparent that a substantially fool-proof positive pitch lock mechanism has been provided which includes the hydraulic latching mechanism described and which will prevent a pitch reduction when a predetermined propeller overspeed occurs regardless of the reason for such overspeed so that an overspeed condition is the sole signal for permitting the pitch lock to assume a locked position.

In addition the invention prevents unlocking the pitch lock until the propeller R. P. M. has reached a predetermined value below the overspeed setting and the propeller is also able to change pitch toward a higher blade angle.

Although only certain embodiments of this invention have been illustrated and described herein, it will be apparent that various modifications and changes may be made in the arrangement and construction of the various parts without departing from the scope of this novel concept.

What it is desired to obtain by Letters Patent is:

1. A variable pitch propeller including a hub and a plurality of blades mounted for pitch changing movement relative to said hub, means for varying the pitch of said blades, a pitch lock engageable with said blades and fixed for rotation with said hub, means for operating said lock, means for controlling the engagement and disengagement of said pitch lock, and a hydraulic latch for maintaining said lock in a disengaged position until a predetermined propeller rotational speed exists including operative connections to said controlling means.

2. A variable pitch propeller including a hub and a plurality of blades mounted for pitch changing movement relative to said hub, means for varying the pitch of said blades, a pitch lock engageable with said blades and fixed for rotation with said hub, means for controlling the engagement and disengagement of said pitch lock including a source of fluid under pressure for operating said pitch lock, a hydraulic latch for maintaining said lock in a disengaged position, and means responsive to the speed of rotation of the propeller and independent of said latch for operating said controlling means and disabling said latch.

3. A variable pitch propeller including a hub and a plurality of blades mounted for pitch changing movement relative thereto, means for varying the pitch of said blades, a pitch lock fixed for rotation with the hub and engageable with the blades, a source of fluid under pressure, means for disengaging said pitch lock including operative connections to said source of fluid under pressure, a hydraulic latch for maintaining said lock in a disengaged position in response to a loss of pressure from said source including operative connections to said lock and said source, said latch comprising a one way valve, and means responsive to the speed of rotation of the propeller and operatively connected to said latch for disabling said latch including a reciprocable valve having a separate connection to said pitch lock said valve having an operative connection to said source.

4. A variable pitch propeller including a hub and a plurality of blades mounted for pitch changing movement relative thereto, means for varying the pitch of said blades, a pitch lock fixed for rotation with the hub and engageable with the blades, a source of fluid under pressure, means for disengaging said pitch lock including operative connections to said source of fluid under pressure, a hydraulic latch for maintaining said lock in a disengaged position in response to a loss of pressure from said source including operative connections to said lock and said source, and means responsive to the speed of rotation of the propeller operatively connected to said latch for disabling said latch including a reciprocable valve having a separate connection to said pitch lock and having an operative connection to said source.

5. A variable pitch propeller according to claim 4 wherein said speed responsive means includes a flyweight operatively connected to said reciprocable valve for operating the latter.

6. A variable pitch propeller according to claim 5 including a source of low pressure and passages connecting said source with said reciprocable valve.

7. A variable pitch propeller according to claim 5 wherein said speed responsive means comprises a flyweight and a spring loaded member pivoted intermediate its ends, one end of said member including a rack engaging said valve.

8. A variable pitch propeller according to claim 7 wherein said reciprocable valve is rotary and includes a toothed member engaging said rack.

References Cited in the file of this patent

UNITED STATES PATENTS

| 2,274,334 | Keller | Feb. 24, 1942 |

FOREIGN PATENTS

| 112,850 | Australia | Apr. 24, 1941 |
| 496,022 | Great Britain | Nov. 23, 1938 |